United States Patent

[11] 3,630,429

| [72] | Inventors | Yoshio Matsuda;<br>Shigenobu Ozaki, both of Itami-shi, Japan |
|---|---|---|
| [21] | Appl. No. | 809,597 |
| [22] | Filed | Mar. 24, 1969 |
| [45] | Patented | Dec. 28, 1971 |
| [73] | Assignee | Sumitomo Electric Industries, Ltd.<br>Osaka, Japan |
| [32] | Priority | Apr. 25, 1964 |
| [33] | | Japan |
| [31] | | 39/23483 |
| | | Original application Apr. 15, 1965, Ser.<br>No. 448,411, now Patent No. 3,443,305,<br>dated May 13, 1969. Divided and this<br>application Mar. 24, 1969, Ser. No.<br>809,597 |

[54] APPARATUS FOR PRODUCING COMPOSITE METALLIC WIRE
9 Claims, 13 Drawing Figs.

[52] U.S. Cl. .................................................. 228/3,
29/474.1, 228/4, 228/5, 228/21
[51] Int. Cl. ............................................. B23k 21/00,
B23p 3/02

[50] Field of Search ........................................... 228/19, 17,
4, 5, 21, 3; 29/470.1, 474.1

[56] References Cited
UNITED STATES PATENTS

| 3,167,857 | 2/1965 | Saito et al. .................... | 29/474.1 |
| 3,220,106 | 11/1965 | Clark .............................. | 29/470.1 X |
| 3,444,610 | 5/1969 | Thomson ........................ | 228/3 X |
| 3,449,821 | 6/1969 | Vansteenkiste ................. | 228/3 X |
| 2,893,292 | 7/1959 | Naperola ......................... | 90/24 |

Primary Examiner—John F. Campbell
Assistant Examiner—R. J. Craig
Attorney—Carothers and Carothers ABSTRACT: Apparatus to produce a composite wire wherein a pair of pressure bonding calibered rollers rotatably disposed adjacent one relative to another are provided to form at their point of tangential proximity pressure bonding, oppositely opposed concavities with conjugate concavities formed adjacently thereof, the former concavities to engage and circumferentially compress the outer deposited metallic cladding material on a core wire and the latter concavities to receive and sever laterally extruded excess cladding material.

Patented Dec. 28, 1971
3,630,429
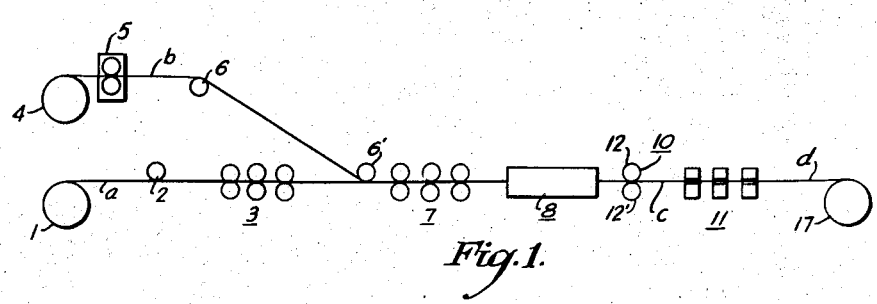
Fig.1.
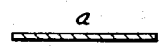
Fig.2.
Fig.3.
Fig.4.
Fig.5.
Fig.6.
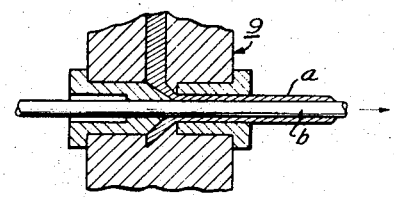
Fig.7.
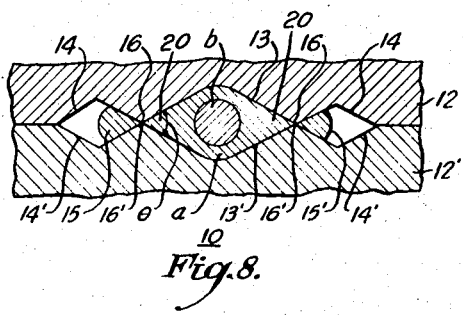
Fig.8.
Fig.9.
Fig.11.
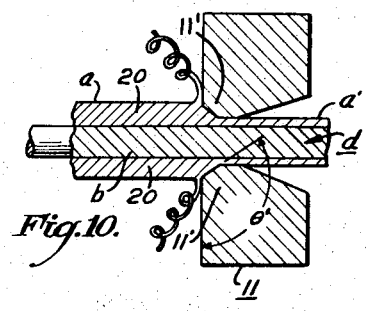
Fig.10.
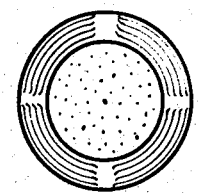
Fig.13.
Fig.12.
INVENTORS
YOSHIO MATSUDA AND
SHIGENOBU OZAKI
BY WILLIAM D. CAROTHERS
THEIR ATTORNEY

APPARATUS FOR PRODUCING COMPOSITE METALLIC WIRE

CROSS-REFERENCES TO RELATED APPLICATIONS

This application is a division of application Ser. No. 448,411 filed Apr. 15, 1965, now U.S. Pat. No. 3,443,305 issued May 13, 1969.

BACKGROUND OF INVENTION

The prior art is plagued with the problem of obtaining uniform pressure bonding of the outer cladding material to a wire core to obtain a uniformly bonded composite metal wire. For example, Saito et al., U.S. Pat. No. 3,167,857 (Cl. 29-474.1) wherein the grooved rollers provided for forming the metallic cladded material onto the core wire do not provide for lateral working of the cladding material so that uniform pressure bonding is provided around the entire interface of the cladding material and core wire. Uniform bonding is acquired by using an elongated lip-shaped concavity die which provides lateral extruding and circumferential working of the cladding material.

If the semicircular type of caliber provides no bonding force to press the cladding material towards the core wire in a direction normal to the direction of the vertical pressing force of the rollers so that defects will occur in the composite wire in that the cladding material will become separated from the core wire. Also, since all the forces applied by the rollers are applied within a single plane, deformity may be caused in the area of applied force on the core wire.

SUMMARY OF INVENTION

The present invention relates to apparatus to form composite metal wires consisting of steel wire or the like cladded with a metal covering of aluminum or other metals. This invention provides for apparatus used in an economical method of manufacturing a composite metal wire without degrading the properties of the core steel wire, by attaching a metal plate in a tape form to the core metal wire to cover it or making a seamless covering by extrusion pressing and scalping the skin part after a pressure bonding process. The use of the apparatus comprising this invention is characterized in that an excellent composite metal wire is obtained by effecting especially effective bonding at the interface between the cladding material and the core wire and at the same time, making the sealing of the covering metal perfect.

Other objects and advantages appear hereinafter in the following description and claims.

The accompanying drawings show, for the purpose of exemplification without limiting the invention or the claims thereto, certain practical embodiments illustrating the principles of this invention wherein:

FIG. 1 is a diagrammatic view to explain an apparatus for carrying out the method of the present invention.

FIGS. 2 to 6 are sectional views to show the steps of the processes for cladding the core wire.

FIG. 7 is a sectional view that shows the forming process where an extrusion press is used.

FIG. 8 is a sectional view with parts broken away that shows the process in which pressure bonding and fin removing steps are carried out simultaneously.

FIG. 9 is a sectional view of the composite body after the completion of the pressure bonding.

FIG. 10 is a sectional view that shows the process of scalping the outer skin.

FIG. 11 is a sectional view that shows a section of the completed wire.

FIG. 12 and FIG. 13 show a view of an exposed section of the product of this invention explaining the metallographic structure.

In explaining the invention in detail, reference to the example of its embodiment is shown in FIG. 1 of the attached drawing, in which a steel core wire is cladded with copper. The copper tape $a$ which is the cladding material is drawn out from the reel 1; has its surface cleaned by the wire brush 2; and is then formed by rows of forming rollers 3 gradually into a U shape as shown in FIGS. 2 through 4. On the other hand, the core $b$ material, plated or not plated, drawn out from the bobbin 4 has its entire surface cleaned and roughened, in particular, by means of shot or grit blast 5. The steel core wire $b$ led by the guide rolls 6, 6' and the aforementioned U-shaped tape $a$ are put together one upon the other as shown in FIG. 5. Then the core wire $b$ is gradually encased and sealed in the tape $a$ by the rows of forming rollers 7. The unbonded composite wire is then heated in the air, or in a reducing or neutral atmosphere, or in a vacuum-heating chamber 8, and is pressed by the pressure rollers 10 (in FIG. 8) so that the cladding tape $a$ and core wire $b$ are pressure bonded on their clean and rough surfaces into one body. The composite wire material $c$ shown in FIG. 9 produced in this way is finished into a composite wire of the required dimensions having a concentric circular cross section by means of dies or a row of dies 11 provided with a blade or blades having an obtuse angle, as shown in FIG. 10. The finished wire $d$ is then taken up by the takeup drum 17.

The pressure bonding rolls 10 are calibered rolls 12, 12', as shown in FIG. 8, which have pressure-bonding concavities 13, 13' which are oppositely opposed and approximating a diamond-shaped contour. There are provided conjugate formed concavities 14, 14' facing each other on both sides to provide room to receive flowing excessive material referred to as fins 15, 15'. As mentioned above, the core wire to be cladded is passed with the cladding tape between these pressure-bonding rollers 10 to deform the cladding material and at the same time to press it against the whole circumferential surface of the core wire, whereby the inner and outer metals are pressure bonded into one body at their intersurface while the excessive material in the form of the fins 15, 15' protruding on both sides are cut off at the same time by means of the pinching lands 16, 16' of the calibered rolls 12, 12'. The composite wire rod $c$ having a cross section in the shape of lips 20 formed by the concavities 13, 13' is shaved of this excessive portion or lips 20 of cladding material by means of dies or a row of dies 11 which are provided with obtused angle blades 11', and is, thus, finished into a composite wire $d$ having a cross section of specified concentric circles. The finished wire is then taken up on a reeling drum 17.

In this process, however, the cladding material has a seam 21 formed by the covering tape $a$, as shown in FIG. 6. Unless this part is completely sealed, it may cause the thickness of the coating to become uneven during the subsequent pressure-bonding process or may allow a liquid or gas to enter from outside to interfere with the pressure bonding. Consequently, where it is possible to form the cladding material by the extrusion press process, there will be no such seam 21 and, therefore, this process is found more favorable.

In order to form copper cladding under the extrusion press process, it is necessary to have an extrusion temperature of 800° C. This causes the steel wire core, whose surface has been cleaned, to become oxidized and contaminated again, so that a complete pressure bonding in the next process may become difficult. On the contrary, however, aluminum can be extruded at a temperature of 450° C. so that it is easier to keep and maintain the steel wire core clean.

In case of steel wire core to be cladded with aluminum, the entire surface of the core wire $b$, which has been plated or not plated as already mentioned, is cleaned and roughened by means of shot blast or the like and is introduced into the extrusion press 9 as shown in FIG. 9 for complete covering and sealing with aluminum, and thereafter undergoing the same subsequent processes as mentioned in the case for copper cladding to be finished into a composite wire.

In the above-mentioned manufacturing processes, what is essential to accomplish the principal object of the present invention, which is the solid phase bonding of the coating and core in one body, is the proper selection of such conditions as the necessary condition of the contact surfaces of the metals, pressure condition, deforming property of the materials, etc.

First, the contact surfaces are greatly affected by the kinds of the metals to be combined, their smoothness, cleanliness, etc. It is absolutely necessary to make the surfaces clean. As the core wire is to be sealed and cladded with the cladding material, the cleaning of the surfaces has to be done before the two materials are composited together. As methods for the cleaning of surfaces, a mechanical method using a wire brush or the like and a chemical method such as acid pickling are employed. However, in the case of steel wire, particularly high-carbon steel wire, acid pickling may produce smut and may cause acid brittleness, so that it is desirable to employ a mechanical method. With the object of facilitating the mechanical cleaning of such a hard surface and of decreasing the contamination of the surface after cleaning, a method is sometimes adopted in which the steel wire is previously plated with a somewhat softer material such as copper, zinc, tin, etc. However, this method has such shortcomings that cracks may take place in the plating layer during the cleaning process and that the properties of the core wire may be deteriorated by the diffusion of the plated metal caused by a rise in temperature. Furthermore, the plating material calls for an additional step in the cleaning process and although it is effective in cleaning, it is not a desirable procedure after all. However, the plating step has, on the other hand, such advantages that wire brushing, the simplest mechanical method of cleaning, can be employed following the plating step and that the cladding can be done quite satisfactorily even after several days from the cleaning. Plating is therefore done in some cases.

Under the present invention it has been discovered that the bonding strength of interface is by far greater where the contact surfaces of the inner and outer metals have been roughened as compared with where they are both smooth. As the blasting method readily has both cleaning and roughening effects even on the surface of such a hard metal as high-carbon steel, the shot blast or grit blast method is employed instead of the wire-brushing method which has been found to cause much wear on high-carbon steel and to be effective in producing a rough surface. The above-mentioned objective is thus attained by this very simple and economical method in which very hard particles are blown against the circumferential surface of the core wire continuously, the blasting material being used repeatedly.

The clean and rough-surfaced core wire $b$ prepared in the above-mentioned way and the tape $b$ which has been subjected to wire brush cleaning (or the mentioned blast cleaning) are put together and immediately sent on to the rows of forming rollers 7 to form a composite sealed wire. It is then heated to a specified temperature in the heating chamber 8 and then pressure bonded, or is shaped into a seamless form by an extrusion press to have the core wire completely sealed in the press cladding material and is then pressure bonded. In the case of shaping by extrusion press which is one of the essential points of the present invention, the thickness of the coating produced has a very good uniformity and the coating extruded on the core wire can be made continuously free from seams, so that a rolling lubricant may freely be used in the next process of pressure bonding without any anxiety of adverse effects, as there is no fear of a harmful liquid or gas finding its way into the coating interior. The forming operation can, therefore, be carried out at a very high efficiency and excellent products can easily be obtained therefrom.

As already mentioned, the forming by extrusion press has to be a high-temperature process because of the ability of the cladding material to change its form. As the extrusion temperature, 450° C. is high enough for the covering with aluminum shown in FIG. 7. At a temperature about as low as this, the oxidation of the core steel wire is almost negligible, so that the operation may be conducted in the air. In the case of copper, nickel, etc., a high temperature near 1,000° C. is required, so that the extrusion covering has to be done in a completely neutral atmosphere or a vacuum in order to maintain the cleanliness of the surface of the core wire.

In the present invention, the use of pressure bonding rollers in the shape of lips in the pressure bonding process is very important for the unification of the bonding force between the inner and outer metals throughout the whole circumference. If rolls with the round caliber are used, there is no bonding force developed to press the cladding material towards the core material in the direction normal to the direction of the vertical pressing force of the rolls, so that there may take place such defects that the cladding material may become separated from the core material on both sides of the core and that the core wire becomes deformed due to excessive force applying to the top and the bottom of the core in the cross section shown in FIG. 8.

If the so-called lip-shaped caliber, in which both sides gradually converge from the top and bottom central portion of the concavities 13, 13', is used as in the method of the present invention, the bonding force acts on the sides as well as the top and bottom of the core wire through the deforming of the cladding material itself, by the calibered rolls 12, 12', so that a uniform-bonding force acts on the entire circumference of the core and consequently an excellent composite wire rod in a uniform-bonding condition around the whole circumference without any abnormal deformation of the core wire is obtained. However, it is suitably necessary to make the proper selection of the shape of the caliber rolls, especially the angle $\theta$ of the cross section thereof when the concavities 13, 13' are in engaged position as shown in FIG. 8, in accordance with the kind of the cladding material being utilized.

This consideration is necessary because of the influence of friction between the roll surfaces and the cladding material which flows along the core material at the time of pressure bonding. Where the deformability of the cladding material is less than that of the core material; for example, where a steel core is cladded with aluminum, it is necessary to make the angle $\theta$ large, while it is necessary to make the angle $\theta$ small where the deformability of the cladding material is comparatively great as compared with that of the core material; for example, where steel is cladded with copper.

According to the results of experiments, where the pressure bonding is completed by a two step pressure bonding process, it is usually advisable to make $\theta$ larger one after the other, for example, $\theta = 60°-90°$ for the first step and $\theta = 90°-120°$ for the second step. Furthermore, it has been confirmed that very good results are obtained by providing a gap at the apex of the angle $\theta$, namely between the opposed pinching lands 16, 16' of the two rolls 12, 12' so that there is no contact in order to permit sufficient flow of the cladding material. It has, therefore, been decided where the caliber of the pressure-bonding rolls is in the aforementioned shape of lips with cavities on both sides connected with it will lead to induce excessive flowing of the cladding material through the thin gaps between these rolls, the excessive material 15, 15' which has flowed into these parts being pinched sufficiently to be cut off by means of the blades 16, 16' on both sides of the lip caliber at the same time.

With the composite rod $c$ obtained in this way, however, only the core $b$ has a truly round cross section but the cladding material has a noncircular cross section in the shape of lips 20, as shown in FIG. 9. It is therefore required to shave the composite wire $c$ of the excessive portion to make it round and concentric with the core $b$.

Event if the outer circumference is truly round and the core is truly round, the two will not be concentric but will be eccentric, if the shaving is not done properly in this case.

Accordingly to the results of experiments carried out with respect to the apparatus of this invention, good results were obtained by using shaving dies which had bearing surfaces forming a blade disposed at an angle $\theta'$, being an obtuse angle as shown in FIG. 10 and applying a back tension in addition to a shaving action.

The metallographical structure of the cross section of the composite wire after the above-described shaving is shown in FIGS. 12 and 13. The cladding material distorts and flows in the axial direction of the core and in directions normal to it and the tips or fins 15, 15' of the flows are cut off by pinching lands 16, 16', excessive portions or lips 20 being further shaved off to make the composite wire round. This structure, however, neither deteriorates the properties of the wire formed nor renders to it any structural orientation.

The requisite quantity of the cladding material in the final product of the present method is by far smaller than the quantity of the cladding material at the beginning. It is desirable that the cladding material is in as small a quantity as possible. For this purpose, it is necessary to increase the relative deformability of the core material and the cladding material. However, as the shape of the core should not be changed, it is better in practice to increase the deformability of the cladding material. The aforementioned type of pressure rollers 10 having guide holes or conjugate concavities 14, 14' on both sides is effective in promoting the flow of the cladding material, and the heating of the cladding material increases its deformability still further.

As to experiments concerning cladding material and thickness and temperature of operation of the apparatus herein, and temperature relationship between the cladding covering and the core wire to produce the best possible results in a composite wire, reference is made to U.S. Pat. No. 3,443,305 issued May 13, 1969.

When using the apparatus for forming the cover from a tape, the contact surfaces of the inner and outer metals are particularly cleaned and roughened in the first instance, so that the pressure bond between the two metallic surfaces may become exceedingly strong as a result of rough surface bonding. Where the apparatus is employed in the case in which the cladding material is formed into a seamless pipe by preheating the cladding material in the billet form and hot extruding it by an extrusion press, and equally strong bond can be obtained by pressure bonding, the fresh clean surface of the cladding material created through an extreme extruding deformation and the clean and rough surface of the core material.

With regard to the shaving off excessive material, a series of a requisite number of dies may be required, depending on the quantity of the excessive material, since the quantity scalped off by a single shaving die is limited. In shaving off excessive material, the application of a back tension to the wire rod is highly effective in making the operation easy and dependable. Where a plurality of dies are positioned continuously in a series, the preceding dies give a back tension to subsequent dies, so that it requires only one travel of the composite wire c through the rows of dies to complete the necessary shaving, it being made possible to make the shaving quantity of each die within desired limits and the vibration of the wire rod or core being prevented by the tension given between aligned dies to obtain a smoothly finished wire surface and prevent even a slight variation in the thickness of the clad coating.

There have been presented examples of an embodiment of materials to use as the composite wire materials where a steel core is cladded with copper or a steel core is cladded with aluminum. Besides a steel core, however, wires of iron, copper, nickel, their alloys, etc., which have a comparatively great resistance to deformation, may be used. Needless to say, the cladding metals should have a smaller resistance to deformation than the core material, such as, copper, aluminum, lead, or nickel. These metals and their alloy tapes may be used for the cladding material.

We claim:

1. An apparatus to work and uniformly pressure bond metallic cladding material to core wire forming a covering for the latter to produce a composite wire comprising a pair of pressure-bonding calibered rollers rotatably supported on adjacent parallel axes to receive said composite wire therebetween, lip-shaped oppositely opposed concavities formed at the point of tangential proximity of said rollers to engage, compress and circumferentially bond the metallic cladding material to the core wire and circumferentially work said material to permit excess cladding material to extrude laterally thereof and conjugate concavities formed adjacent of said lip-shaped concavities to receive said extruded excess cladding material.

2. The apparatus of claim 1 characterized in that said lip-shaped concavities established by said calibered rollers at the point of said tangential proximity in cross section are in the form of a diamond-shaped contour with acute angled apexes.

3. The apparatus of claim 1 characterized in that said lip-shaped concavities established by said calibered rollers at the point of said tangential proximity in cross section are in the form of a diamond-shaped contour with obtuse angled apexes.

4. The apparatus of claim 1 characterized by pinching lands formed between said conjugate concavities and said lip-shaped concavities at the point of said tangential proximity to sever said excess cladding material upon being extruded laterally therebetween.

5. The apparatus of claim 1 characterized by shear dies having a blade surface disposed at an obtuse angle from a plane normal to the axis of said composite wire passed therethrough after being passed through said calibered rollers to reduce and finish the composite wire to the desired outer concentric circular contour.

6. Apparatus to work and uniformly pressure bond metallic cladding material formed as covering on a core wire to produce a composite wire comprising a pair of calibered rollers rotatably disposed in adjacent parallel alignment with their peripheral surfaces forming at their point of tangential proximity pressure bonding, oppositely opposed concavities in the form of a diamond-shaped cross-sectional contour to receive said composite wire and compress and circumferentially bond said metallic cladding material to said composite wire with excess cladding material being extruded laterally thereof.

7. The apparatus of claim 6 characterized by oppositely opposed concavities conjugate to each side of said pressure-bonding concavities at said point of tangential proximity to receive said extruded excess cladding material.

8. The apparatus of claim 7 characterized by pinching lands formed between said conjugate concavities and said pressure-bonding concavities at the point of said tangential proximity to sever said excess cladding material upon being extruded laterally of said pressure-bonding concavities.

9. The apparatus of claim 8 characterized by a series of shear dies each having a blade surface disposed at an obtuse angle measured from a plane normal to the axis of said composite wire passed therethrough after being initially passed through said calibered rollers to successively shave off excess cladding material and reduce and finish the composite wire to the desired outer concentric circular contour.

* * * * *